United States Patent [19]

Cheng

[11] Patent Number: 5,061,406
[45] Date of Patent: Oct. 29, 1991

[54] IN-LINE GAS/LIQUID DISPERSION

[75] Inventor: Alan T. Cheng, Livingston, N.J.

[73] Assignee: Union Carbide Industrial Gases Technology Corporation, Danbury, Conn.

[21] Appl. No.: 587,745

[22] Filed: Sep. 25, 1990

[51] Int. Cl.$^5$ ................................................ B01F 3/04
[52] U.S. Cl. ............................ 261/76; 261/DIG. 78; 261/DIG. 56; 261/DIG. 75
[58] Field of Search ........ 261/76, DIG. 78, DIG. 75, 261/DIG. 56

[56] References Cited

U.S. PATENT DOCUMENTS

| | | | |
|---|---|---|---|
| 2,413,102 | 12/1946 | Ebert et al. | 261/DIG. 75 |
| 4,087,493 | 5/1978 | Petermann | 261/DIG. 78 |
| 4,109,983 | 4/1977 | Mandt | 261/76 |
| 4,217,313 | 8/1980 | Dmitrievsky et al. | 261/DIG. 78 |
| 4,224,158 | 9/1980 | Molvar | 261/76 |
| 4,231,383 | 11/1980 | Eversole et al. | 261/DIG. 78 |
| 4,280,969 | 7/1981 | Swanson | 261/DIG. 78 |
| 4,430,251 | 2/1984 | Patterson et al. | 261/DIG. 56 |
| 4,639,340 | 1/1987 | Garrett | 261/36.1 |
| 4,861,352 | 8/1989 | Cheng | 55/53 |
| 4,867,918 | 9/1989 | Kiyonaga et al. | 261/76 |
| 4,931,225 | 6/1990 | Cheng | 261/76 |

Primary Examiner—Tim Miles
Attorney, Agent, or Firm—Alvin H. Fritschler

[57] ABSTRACT

The dispersion of a gas in a liquid is enhanced by the use of an adjustable conical mixer to control the flow of a gas/liquid mixture to a venturi device used to accelerate the mixture to a supersonic velocity with subsequent deacceleration to subsonic velocity to produce sonic shock waves in the mixture.

11 Claims, 1 Drawing Sheet

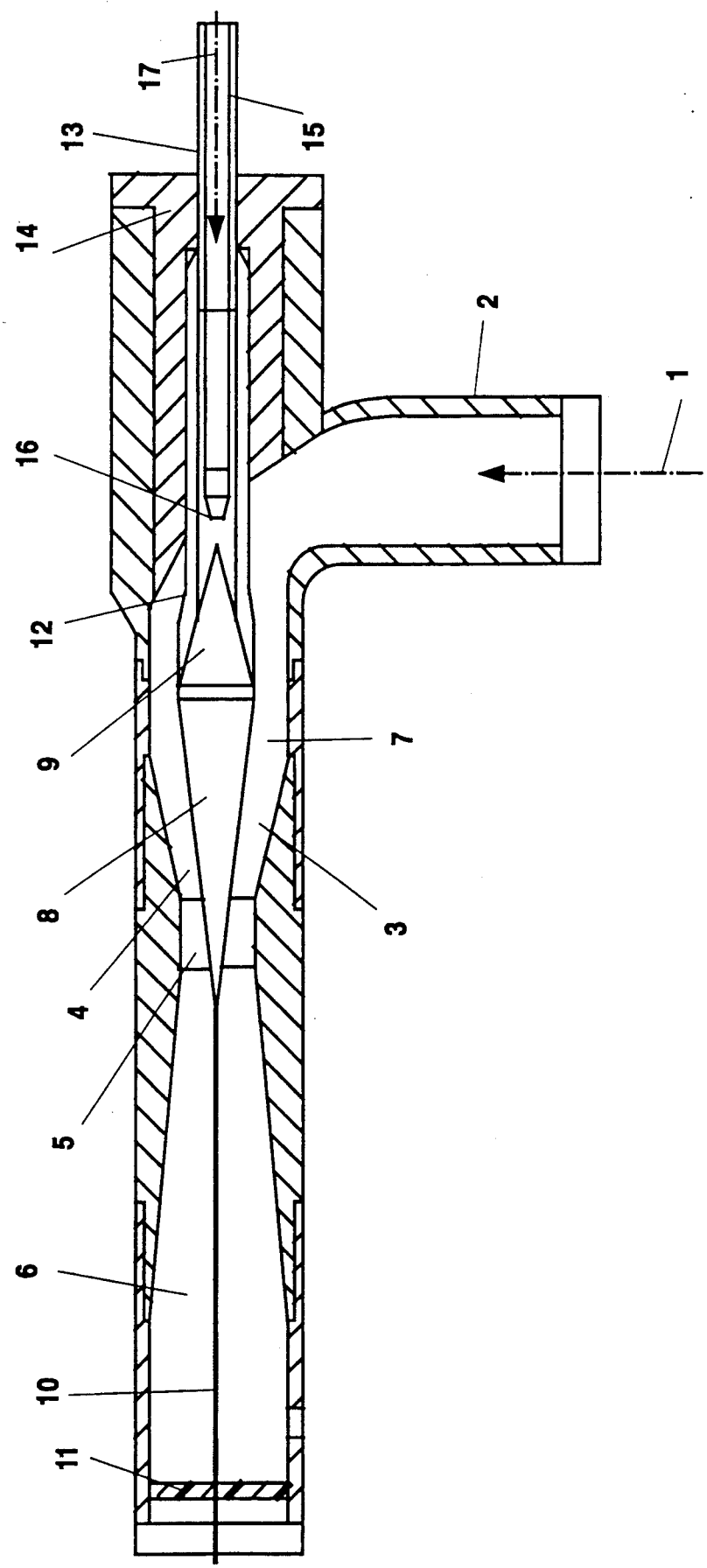

IN-LINE GAS/LIQUID DISPERSION

BACKGROUND OF THE INVENTION

1. Field of the Invention

This invention relates to the mixing of gases and liquids. More particularly, it relates to enhancing the dispersion of gases in liquids.

2. Description of the Prior Art

The dispersion of gases in liquids is an important feature of a wide variety of industrial operations. Thus, gases are dispersed in liquids for numerous gas dissolving, gas-liquid reaction and gas stripping of dissolved gas applications. As the gas is more finely dispersed in the liquid in the form of very small gas bubbles, the interfacial surface area between the gas and liquid is appreciably increased as compared to the surface area between the liquid and a like quantity of gas in the form of larger gas bubbles. In turn, an increase in the interfacial surface area between the gas and liquid is known to increase the mass transfer of the gas from the gas bubbles into the liquid, as well as the transfer of dissolved gas from the liquid into the gas bubble. Thus, by providing much higher interfacial area, all gas-liquid processes, such as gas dissolution, gas stripping and gas reactions between the gas phase and substances in the liquid phase will be improved.

The use of sonic shock waves to reduce the size of gas bubbles dispersed in a liquid is known in the art. Garrett, U.S. Pat. No. 4,639,340, discloses a particular technique directed particularly to the dissolving of oxygen in waste water. According to this technique, oxygen is uniformly dispersed in a waste water stream, which is then exposed to turbulent flow conditions and passed to a venturi for acceleration to a flow velocity in excess of the speed of sound in said gas-liquid mixture. A sonic shock wave is thereby created, and relatively coarse bubbles of oxygen are sheared into smaller bubbles by the turbulence resulting from the sonic shock wave.

Kiyonaga et al, U.S. Pat. No. 4,867,918, disclose an improvement comprising the combining of gas and liquid in close proximity to a venturi or other flow constriction means used to create supersonic flow velocities and subsequent deacceleration to subsonic velocity. Cheng, U.S. Pat. No. 4,861,352, discloses an in-line stripping method employing a venturi device and capable of accelerating at least a portion of the stripping gas or vapor/liquid composition to a supersonic velocity for the composition. In a further development, Cheng, U.S. Pat. No. 4,931,225, has disclosed a method and apparatus for dispersing a gas or vapor in a liquid in which the gas or vapor is injected into the liquid at a linear velocity which is sonic for at least a portion of said gas or vapor at the time of contact, with a composition comprising the liquid and said gas or vapor being caused to flow cocurrently with at least a portion of the composition being caused to flow at a linear velocity that is at least sonic.

Despite such useful advances, there remains a need and desire in the art for further developments to enhance the dispersion of gases in liquids. Such requirements pertain to gas-liquid processing operations in general, and are related to the continual desire in the art for improvement in industrial processing operations and to the reduction of equipment fabrication costs associated therewith. There is also a general desire in the art for a more efficient use of oxygen, nitrogen and other industrial gases in a wide variety of commercial applications in which industrial gases are presently employed or could be employed to improve current practice in the art. In particular, there is a desire in the art for in-line gas/liquid mixers having enhanced flexibility for use with a variety of gas/liquid mixing applications and operating conditions.

It is an object of the invention, therefore, to provide an improved process and system for the dispersion of gases in liquids.

It is another object of the invention to provide a process and system for enhancing the interfacial surface area between a gas and a liquid in which it is dispersed so as to enhance the mass transfer between such gas and liquid.

It is a further object of the invention to provide a process and system capable of enhancing the efficiency of gas-liquid dispersion operations and of providing operating flexibility with respect to various gas/liquid mixing applications and operating conditions.

With these and other objects in mind, the invention is hereinafter described in detail, the novel features thereof being pointed out in the appended claims.

SUMMARY OF THE INVENTION

Enhanced dispersion of a gas in a liquid and desired operating flexibility are achieved by the use of an adjustable conical mixer in conjunction with a venturi device for accelerating a gas/liquid mixture to supersonic velocity.

BRIEF DESCRIPTION OF THE DRAWING

The invention is further described with reference to the accompanying single FIGURE drawing representing a side elevational view, partly in cross section, of an embodiment of the gas/liquid dispersion system of the invention.

DETAILED DESCRIPTION OF THE INVENTION

The objects of the invention are accomplished by the use of an adjustable in-line conical mixer to adjust the velocity profile and the pressure drop associated with the use of a venturi-type gas/liquid mixing device. By such adjustment, enhanced dispersion of gas bubbles in the liquid can be facilitated in the field to meet the requirements of a specific gas/liquid mixing operation.

The enhanced dispersion obtained in the practice of the invention results from the acceleration of the gas/liquid mixture from subsonic to supersonic flow velocities, with subsequent deacceleration to subsonic levels. Depending on the particular gas/liquid ratio employed, the velocity of sound in an air/water mixture, for example, may be on the order of about 20 meters per second. In the use of a venturi-type in-line gas/liquid mixer, the reduced diameter or neck section of the venturi is adapted to cause the flow velocity of the gas/liquid mixture to accelerate from the subsonic flow velocity at which the mixture in the flow conduit approaches the converging section and the reduced diameter section of the venturi to a supersonic velocity. As the gas/liquid mixture exits from the reduced diameter section, its velocity is decreased in the diverging section and in the flow conduit to a desired velocity in the subsonic range as determined by the diameter of the flow conduit downstream of the venturi. The reduced diameter section of the venturi not only creates a desired increase in flow velocity, but an accompanying increase in pressure loss across the venturi. Such increased power loss increases the power requirements of the overall gas/liquid dispersion operation, and is generally undesirable from on overall efficiency and cost viewpoint. As will be appreciated by those skilled in the art, the tapered configuration of a venturi achieves the desired acceleration-deacceleration to above and below the velocity of sound in the gas/liquid mixture at the prevailing pressure conditions, while tending to minimize the accompanying pressure loss in the flow conduit.

By the acceleration of the gas/liquid mixture to a flow velocity in excess of the sonic sound level in said mixture by means of a venturi, with subsequent deacceleration to subsonic velocity, sonic shock waves are produced that result in the creation of fine gas bubbles with a very high mass transfer surface area dispersed in said liquid. Such enhanced gas/liquid dispersion is highly advantageous for a wide variety of gas dissolution, gas/liquid reaction and gas or liquid component stripping applications in which the finely dispersed gas bubbles serve as a stripping gas. In all such applications, the enhanced interfacial surface area between a gas and the liquid in which it is dispersed enhances the mass transfer between such gas and liquid.

While the venturi-type gas/liquid mixer is thus a highly desirable means for obtaining enhanced gas/liquid dispersions, it will be appreciated that it is difficult to design such venturi systems for a wide variety of individual applications. Thus, the theoretical velocity of sound in a two phase flow stream will vary with the temperature, operating pressure and thermodynamic properties of the particular gas and liquid employed. Furthermore, the optimum velocity of the gas/liquid mixture commonly has to be compromised due to insufficient available pumping pressure. However, it is not generally desirable or practical to custom build venturi devices for each particular gas/liquid dispersion application, because such an approach would be both time consuming and expensive.

The venturi-conical mixer combination of the invention serves to eliminate such drawbacks of a typical venturi device with a fixed velocity profile. The in-line stripper of the invention uses a relatively large venturi angle in the converging portion thereof, together with an adjustable conical device adapted to adjust the annular opening between the wall of the venturi and the conical device to optimize the flow velocity and minimize the associated pressure drop for a given gas/liquid dispersion application. The annular opening can be adjusted by changing the distance of the conical mixer from the neck portion of the venturi.

In the use of a venturi device to create sonic shock waves in a gas/liquid mixture, it has been found that the velocity profile of a developing supersonic flow is highly non-linear. Thus, the gas/liquid might have an average velocity much higher than the theoretical sonic flow, but only a small portion of the flow near the center of profile may actually be at supersonic velocity. The viscous layer near the venturi wall would remain at subsonic velocity in this case. By the use of an in-line conical mixer in combination with a venturi in the practice of the invention, the velocity profile through the combined device is flattened through said annular opening between the conical mixer and the converging section of the venturi. This causes a larger portion of the flow to be in the supersonic range. It is such supersonic flow of the gas/liquid mixture, and the subsequent deacceleration to subsonic velocity in the diverging diameter section and/or the neck section of the venturi, that produces sonic shock waves within the mixture for the enhanced formation of fine gas bubbles dispersed in said liquid.

In the illustrative embodiment of the invention shown in the drawing, a liquid stream represented by the numeral 1 passes through flow conduit 2 and into venturi 3 having converging section 4, neck section 5 and diverging section 6. Conical mixer 7 is positioned so that cone 8 thereof is positioned in said converging section 4 with its enlarged end positioned in the upstream direction and its pointed end positioned in the downstream direction approaching and extending into neck section 5 of the venturi. Companion cone 9 of the conical mixer is positioned with its enlarged end in the downstream direction adjacent to the enlarged section of cone 8 and with its pointed end positioned in the upstream direction. A support tube 10 at the downstream end of cone 8 extends through venturi diverging section 6 and is slidably positioned within stabilizer member 11, which conveniently comprises a metal member with a Teflon center ring for positioning of said support tube 10.

Conical mixer 7 is also supported by support member 12 secured to outer tube 13 that extends through body member 14 from an upstream direction and contains inner gas injection tube 15, which is positioned so that injection nozzle 16 at the downstream end thereof is in the vicinity of said cone 9. Said gas injection tube 15 extends in an upstream direction and is in communication with a gas stream represented by the numeral 17.

The positioning of outer tube 13 and support member 12 relative to venturi 3 can readily be adjusted by hand or by the use of mechanical means, such as a threaded screw member or the like. It should be noted that the walls of converging section 4 of the venturi is typically configured at an angle of about 15° to the horizontal center line of the venturi. In the practice of the invention, the venturi is generally at a somewhat larger angle, e.g., about 20°, with the surfaces of cone 8 being angled typically at about 5°, thereby providing an annular opening 18 between the wall of converging section 4 of the venturi and cone 8 of about 15°. By the movement of conical mixer 7 closer to, or further from, neck section 5 of venturi 3, the velocity profile and the pressure drop associated with the passage of a mixture of liquid stream 1 and gas stream 16 formed upstream through the venturi-conical mixer combination of the invention can be adjusted in the field to meet the requirements of a particular gas dispersion application. The annular opening for the passage of the gas/liquid mixture through the converging section of the venturi can easily be cleaned by simply moving the conical mixer away from the venturi. It should be noted that the conical mixer can also be motor driven as by connection to a pressure regulator device. Such a motor drive can be very desirable in certain applications, such as, for example, polyol and polymerization reactions in which the viscosity of the gas/liquid mixture may vary between 10 and several through centipose during the course of the reaction.

As indicated above, the invention can be used in the wide variety of operations in which enhanced dispersion of a gas in a liquid is desired. In applications in which the gas is used as a stripping gas, the invention can readily be used to strip from the liquid either a gas entrained in such liquid, a gas dissolved therein, or a volatile liquid component of a particular liquid stream. In an illustrative example of the practice of the invention, an enhanced gas/liquid dispersion was achieved by the use of the combined venturi-conical mixture device of the invention for the purpose of stripping and removing dissolved oxygen from tap water on a once-through basis. The stripping gas was nitrogen employed at an injection rate of 0.65 scfm. The tap water was passed through a 1.5" diameter flow line at a flow rate of 10 gpm at a temperature of 13.6°–14.2° C. The venturi employed had a converging section configured at an angle of 15°, with a longer reduced angle diverging section to minimize pressure loss in the system. The pointed end of downstream cone 8 of conical mixer 7 was positioned at distances of from about 0.2" to about 1.7" from closing in the venturi, i.e., from the point at which the conical mixer closes off the flow of fluid to the venturi to the extent that excessive pumping power is required to enable the gas/liquid mixture to be passed through the venturi. Stripping effectiveness was determined in terms of the fractional reduction of oxygen in the tap water. As used herein, the term "fractional reduction" means the ratio of the concentration of oxygen in the tap water upstream of the mixing device of the invention minus the concentration at a location immediately downstream thereof divided by said upstream concentration. It was found that an optimum fractional reduction of about 0.875 occurred at a positioning of the conical mixer at about 0.2" from said closing position, with said fractional reduction decreasing to about 0.8 at a distance of about 0.4", and to about 0.6 at a 1" positioning from the closing position, said fractional reduction remaining unchanged as the conical mixer was further moved back to about 1.7" from the closing position.

In another illustrative example of the desirability of the adjustment capability provided by the invention, the adjustable venturi-conical mixer device of the invention was used to remove a liquid from another, namely water moisture from a fatty ester. Employing the adjustable in-line stripper of the invention in a 2" flow conduit, water moisture was reduced from 1,000 to 3,000 ppm to less than 200 ppm, in runs carried out with 3,800 gallons of said esters at temperatures of about 102° C. to 111° C. With the conical mixer positioned at 1 $^{17}/_{32}$" from the closing position and at an inlet pressure of 49 psig and a liquid flow rate of 127 gpm, the ratio of the water moisture concentration upstream to said concentration downstream was 1.7, with said concentration ratio increasing to 2.7 with a conical mixer positioning of 1 $^{11}/_{32}$" at an inlet pressure of 50 psig and a liquid flow rate of 141 gpm. With the conical mixer positioned at $^{25}/_{32}$" and at an inlet pressure of 55 psig and a liquid flow rate of 76 gpm, said concentration ratio rose to 10.4, indicating a considerable reduction in the concentration of the water moisture using the closer placement of the conical mixer to the venturi at the different flow rate pressure and temperature conditions of the various runs.

It will be appreciated from such examples that a particular gas/liquid dispersion operation can be enhanced by the practice of the invention to enable an optimum positioning of the conical mixer used to control the annular opening and the flow of the gas/liquid mixture therethrough to the venturi for formation of sonic shock waves in the gas/liquid mixture upon acceleration to supersonic velocity and subsequent deacceleration to subsonic velocity in the diverging section of the venturi. It will be understood that such advantageous use of the adjustable feature of the invention pertains not only for the stripping applications of the illustrative examples but to any application in which it is desired to enhance the dispersion of fine gas bubbles in a liquid. The oxygenation or hydrogenation of organic chemicals or other materials available in liquid or slurry form, and the dissolving of a gas in a liquid, as with the desired dissolving of oxygen in waters for fish farms or other practical applications, are examples of other desirable applications of the invention.

In an advantageous embodiment of the invention, very fine gas bubbles with a very high mass transfer surface area are produced as a result of the subjecting of the gas and liquid mixture to two consecutive sonic shock waves. The first sonic shock wave is produced by the injection of the gas into the liquid at an injection velocity that exceeds the sonic velocity in the gas/liquid mixture, the second sonic shock wave being created when the gas/liquid mixture is accelerated to a velocity higher than the sonic sound level in said mixture, with subsequent deacceleration to subsonic velocity in the venturi device complemented by the conical mixer employed as herein disclosed and claimed.

While the invention has been described herein in particular with respect to the injection of gas into a liquid stream, it will be understood that it is also within the scope of the invention to provide for the injection of a liquid into a flowing gas stream to produce the desired gas/liquid mixture that is passed through the venturi-conical mixer of the invention to enhance the dispersion of fine bubbles of gas in the liquid.

As the annular flow supersonic in-line stripper of the invention, employing a venturi device in combination with a conical mixer, can be adjusted to meet any operating conditions pertaining to any desired gas/liquid dispersion operation, it can readily be stocked and used as a standard device for a variety of operations. The adjustable mixer of the invention thus can be used in place of other in-line mixing devices having fixed velocity profiles and an inability to respond, as the invention can respond, to the requirements for optimum performance in a variety of gas/liquid dispersion applications under differing operating conditions as encountered in practical industrial operations.

I claim:

1. An improved system for the dispersion of a gas in a liquid comprising:
    (a) a flow line in which said gas and liquid are mixed;
    (b) flow means for passing one of the fluids to be mixed through said flow line;
    (c) injection means for injecting the other fluid for the desired mixture of gas and liquid into said flow line to form a gas bubble/liquid mixture;
    (d) a venturi device positioned in said flow line downstream of the point at which said gas bubble/liquid mixture is formed, said venturi device comprising a converging diameter section, a neck section of smallest diameter, and a diverging diameter section expanding in diameter in the downstream direction;
    (e) a conical in-line mixer positioned in said flow line downstream of the point at which said gas bubble/liquid mixture is formed, said conical mixer comprising a first cone portion having its enlarged section positioned in the downstream direction and a second cone portion having its enlarged section adjacent that of the first cone portion and its pointed end section positioned downstream thereof in the converging diameter section of the venturi device, the enlarged sections of said cone portions of the mixer being of essentially the same diameter, said second cone portion being positioned such as to form, together with the walls of the converging diameter section of the venturi device, an annular opening for the passage of the gas bubble/liquid mixture to the neck section of the venturi device, said annular passage being adapted to accelerate a high portion of the flow velocity of said mixture to supersonic velocity, with subsequent deacceleration of the flow velocity to subsonic range in the diverging diameter section and/or the neck section of the venturi device, such acceleration-deacceleration action of the venturi device-conical in-line mixer serving to create a sonic shock wave effect resulting in the fine dispersion of the gas bubbles in the liquid, said conical in-line mixer being adjustable so as to enable said conical mixer to be positioned at any desired distance from its closing position in the venturi device so as to adjust the annular opening between the converging diameter section of the venturi and the second cone portion of the conical mixer; and (f) means for adjusting the position of said conical mixer in the flow line, whereby said system can be used to provide enhanced gas bubble/liquid dispersions under a wide range of operating conditions for a wide variety of gas/liquid dispersion operations.

2. The system of claim 1 in which said injection means comprise means for injecting said other fluid at a sonic velocity in said gas/liquid mixture so as to create an initial sonic shock wave, said initial shock wave and the sonic shock wave produced in the venturi device-conical mixer, resulting in very fine dispersion of the gas bubbles in the liquid, with an extremely high mass transfer surface area being produced as a result of the consecutive sonic shock waves in the gas bubble/liquid mixture.

3. The system of claim 1 in which said flow means comprise means for passing liquid through the flow line, and said injection means comprise means for injecting gas into the liquid passing through said flow line in the direction of said conical mixer and the venturi device downstream thereof.

4. The system of claim 1 in which said flow means comprise means for passing liquid through the flow line, and said injection means comprise means for injecting gas into the liquid passing through said low line in the direction of said conical in-line mixer and the venturi device downstream thereof.

5. The process of claim 4 in which the liquid is passed through the flow line in the direction of the conical in-line mixer and said venturi device, and gas is injected into said liquid.

6. An improved process for the dispersion of a gas in a liquid comprising;
(a) combining said gas and liquid to form a gas bubble/liquid mixture in a flow line, said mixture having a velocity of less than the velocity of sound in said gas bubble/liquid mixture;
(b) passing said gas bubble/liquid mixture into contact with a venturi device-conical in-line mixer combination positioned in said flow line, said venturi device comprising a converging diameter section, a neck section of smallest diameter, and a diverging diameter section expanding in diameter in the downstream direction, said conical in-line mixer positioned in the flow line downstream of the point at which said gas bubble/liquid mixture is formed, said conical mixer comprising a first cone portion having an enlarged section positioned in the downstream direction and a second cone portion having its enlarged diameter section adjacent that of the first cone portion and its pointed end section positioned downstream thereof in the converging diameter section of the venturi device, the enlarged section of said cone portions being of essentially the same diameter, said second cone portion being positioned such as to form, together with the walls of the converging diameter section of the venturi device, an annular opening for the passage of the gas bubble/liquid mixture to the neck section of the venturi device, said annular passage being adapted to accelerate a high portion of the flow velocity of said mixture to supersonic velocity, with subsequent deacceleration of the flow velocity to subsonic range in the diverging diameter section and/or the neck section of the venturi device, such acceleration-deacceleration action of the venturi device-conical in-line mixer serving to create a sonic shock wave effect resulting in the fine dispersion of the gas bubbles in the liquid, said conical in-line mixer being adjustable so as to enable said conical mixer to be positioned at any desired distance from its closing position in the venturi device so as to adjust the annular opening between the converging diameter section of the venturi and the second cone portion of the conical mixer; and (c) passing the gas bubble/liquid dispersion through the flow line downstream of the diverging diameter section of the venturi device, whereby an enhanced gas bubble/liquid dispersion can be provided under a wide variety of operating conditions for a wide variety of gas/liquid dispersion operations.

7. The process of claim 6 in which the liquid is passed through the flow line in the direction of the conical mixer and the venturi device, and gas is injected into said liquid.

8. The process of claim 6 and including injecting one fluid into the other at a sonic velocity so as to create an initial sonic shock wave, said initial shock wave and said sonic shock wave produced in the venturi device-conical mixer resulting in very fine dispersion of the gas bubbles in the liquid, with very high mass transfer surface area being produced as a result of the consecutive sonic shock waves in the gas bubble/liquid mixture.

9. The process of claim 6 in which said gas/liquid dispersion comprises a process in which the gas is used to strip a gas or a volatile component from a liquid.

10. The process of claim 6 in which said gas/liquid dispersion comprises a process for the reaction of the gas and liquid.

11. The process of claim 6 in which said gas/liquid dispersion comprises a process for the dissolving of the gas in the liquid.

* * * * *